May 5, 1964  P. MESHBERG  3,131,834
DEVICE AND METHOD FOR DISPENSING MATERIAL UNDER PRESSURE
OF A PROPELLENT IMMISCIBLE GAS
Filed Aug. 23, 1961  2 Sheets-Sheet 1
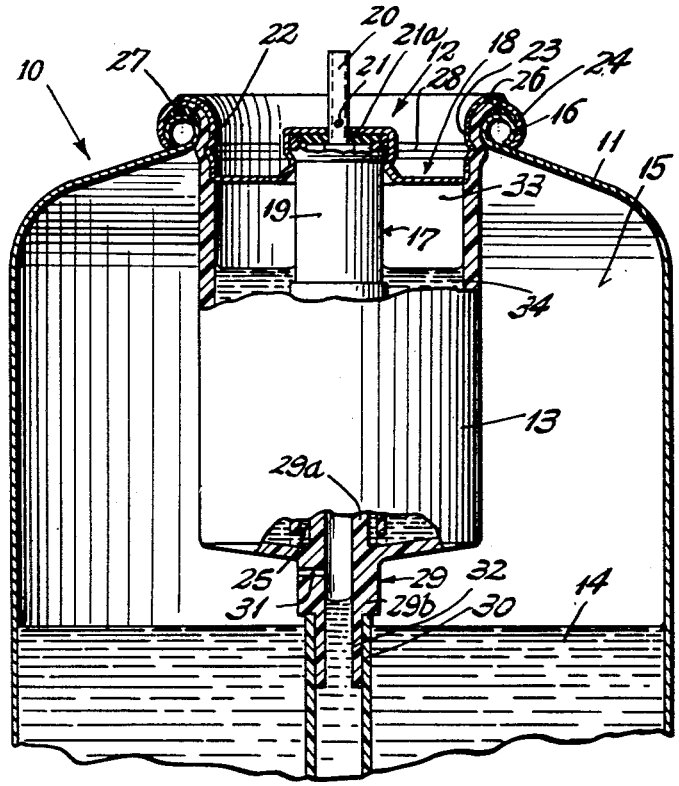
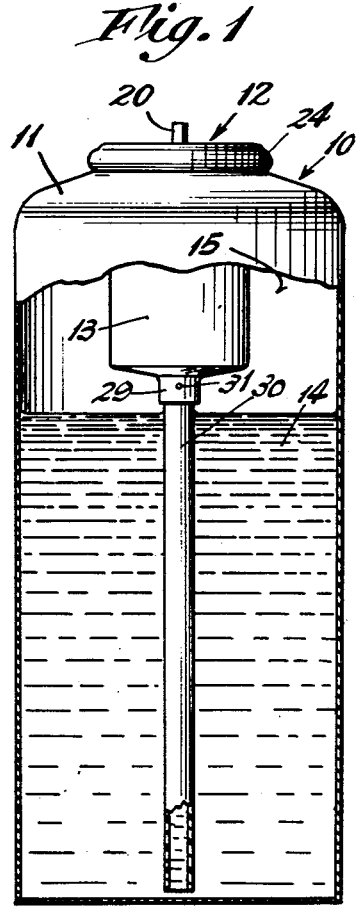
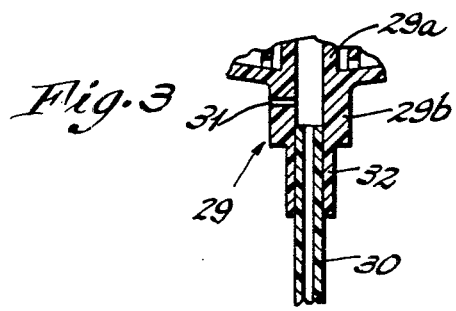
INVENTOR.
Philip Meshberg
BY
Johnson and Kline
ATTORNEYS

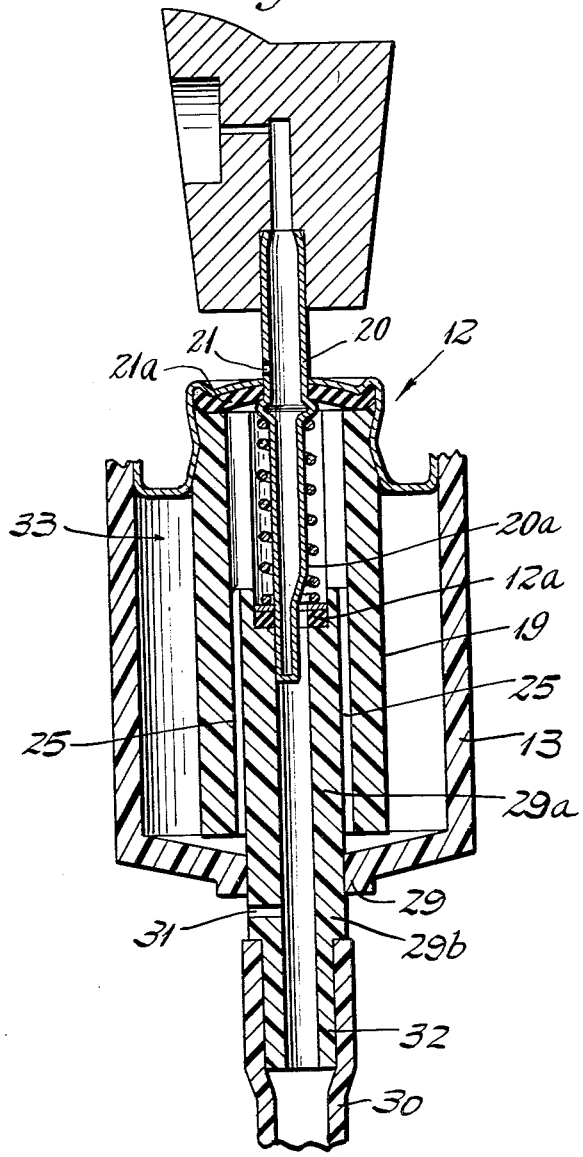

United States Patent Office 3,131,834
Patented May 5, 1964

3,131,834
DEVICE AND METHOD FOR DISPENSING MATERIAL UNDER PRESSURE OF A PROPELLENT IMMISCIBLE GAS
Philip Meshberg, 290 Euclid Ave., Fairfield, Conn.
Filed Aug. 23, 1961, Ser. No. 133,431
8 Claims. (Cl. 222—399)

This invention relates to the controlled discharge of materials from a container which is under pressure of a propellent immiscible gas and, more specifically, it constitutes an improvement over the invention disclosed in my copending application Serial No. 839,899, filed September 14, 1959, now United States Patent No. 3,003,662.

In my prior application I disclosed a method and device for dispensing from a container, which is under pressure of a propellent immiscible gas such as nitrogen, a predetermined measured quantity of material. According to that invention, I trapped a quantity of air at atmospheric pressure in a measuring chamber and then forced material from the container into the measuring chamber, under the pressure of the immiscible gas in the container, through an inlet means so positioned as to compress the trapped air into a trap means so that the pressure of the trapped air in the chamber and the pressure in the container were substantially equal. Thereafter I closed off communication between the container, having the propellent, and the measuring chamber so that a predetermined quantity of the material, such quantity always being substantially constant, was trapped in the measuring chamber between the compressed air in the trap means and the outlet means which communicated the measuring chamber with the atmosphere. In this manner, when the measuring chamber was communicated with the atmosphere through the outlet means, the compressed trapped air expanded to provide the force necessary to drive the material ahead of it and expel it from the chamber.

My prior invention provided for the first time a means whereby measured quantities of material could be controllably discharged from a container which was under the pressure of a propellant immiscible gas, since I eliminated, by utilizing the force of the compressed trapped air, the problem which had heretofore been inherent in metering type valves, namely, the severing of communication between the material to be discharged and the propellent immiscible gas in the container, when the measuring chamber was closed to the container. By utilizing the force of the compressed trapped air in the measuring chamber I, in effect, provided a piston within the measuring chamber itself for driving the material therefrom.

While my prior invention has provided a solution to many of the problems inherent in the discharge of measured quantities of material from a container which is under pressure of a propellent immiscible gas and is particularly adapted to the discharge of materials in a stream or similar manner, I have found that problems are encountered when it is necessary to discharge material from the measuring chamber through a mechanical break-up device to provide a spray or mist, this application or form of discharge being particularly important in the dispensing of pharmaceuticals, such as nasal or oral sprays or the like. The propellent force of the expanding trapped air, while sufficient to discharge all of the material from the measuring chamber, falls off as it expands so that it is insufficient to push all of the material operably through the mechanical break-up device, thus producing a drop-off at the end of the dispensing operation which is evidenced by the material dribbling from the valve.

The present invention overcomes the problem, aforenoted, in my prior invention and provides a sustained propellent force, whereby all of the material is discharged from the measuring chamber at a force sufficient to operate a mechanical break-up device or the like in the desired manner.

According to the invention, I achieve the sustained propellent force by introducing a predetermined quantity of propellent immiscible gas into the measuring chamber to supplement the trapped air and form therewith a propellent charge which is compressed in the same manner as was the trapped air in my prior invention.

It is, therefore, an object of the invention to provide a method for dispensing material from a container which is under the pressure of a propellent immiscible gas by introducing a propellent immiscible gas into a measuring chamber having trap means into which the gas is compressed by the material entering the chamber from the container, along with air trapped in the measuring chamber, for providing a propellent charge in the measuring chamber adapted to drive the material therefrom, under a sustained force, on the chamber being communicated to the atmosphere.

It is also an object of the invention to provide a method for dispensing measured amounts of material from a container under pressure of an immiscible gas by introducing propellent immiscible gas from the container into the material entering the measuring chamber to be compressed and trapped thereby, along with the air trapped in the chamber, so that, on closing the chamber to the container and opening it to the atmosphere, the compressed gas and air will expand and provide a sustained force for driving all of the material from the chamber.

It is another object of the invention to provide a method for producing a self-contained propellent within the measuring chamber of a metering valve which includes introducing a controlled predetermined quantity of the propellent immiscible gas from the container into the material entering the measuring chamber for supplementing the trapped air therein and being compressed therewith by the material entering the chamber under the force of the immiscible gas in the container to produce the propellent charge.

Still another object of the invention is to provide a device for dispensing from a container under pressure of a propellent immiscible gas a measured quantity of material including means for introducing a controlled predetermined quantity of immiscible gas from the container into the measuring chamber for supplementing the air trapped therein and being compressed therewith, by the material entering the measuring chamber, for forming a self-contained propellent charge in the chamber.

It is further an object of the invention to provide a device for dispensing from a container under pressure of a propellent immiscible gas a predetermined measured quantity of material including means forming an orifice, related in size to the size of the dip tube, for communicating the dip tube with the interior of the container above the level of the material therein whereby the immiscible gas in the container is introduced into the dip tube and thence into the measuring chamber so that it is compressed along with the air in the chamber by the material entering from the container to form a self-contained propellent charge in the chamber for providing a sustained force to drive the material from the chamber when the latter is closed to the container and communicated with the atmosphere.

It is still further an object of the invention to provide a method and device for dispensing from a container under the pressure of a propellent immiscible gas a predetermined measured quantity of material at a sustained force by controllably regulating the means for introducing immiscible gas into the chamber relative to the material inlet means.

Other objects and advantages of the invention will be apparent from the specification and claims, when considered in connection with the attached sheet of drawings, illustrating one form of the invention, wherein like characters represent like parts and in which:

FIGURE 1 is an elevational view, partially broken away and in section, showing a dispensing package, in which the container is under pressure of a propellant immiscible gas, embodying the invention;

FIG. 2 is a fragmentary elevational view, partially in section, of the dispensing package of FIG. 1;

FIG. 3 is a fragmentary sectional view of another form of the invention; and

FIG. 4 is an enlarged sectional view of the valve means for dispensing a measured quantity of material.

Referring now to the drawings for a more detailed description of the invention, in FIGS. 1 and 2 a dispensing package 10 is shown embodying the invention. The dispensing package, which is particularly adapted for containing materials under pressure of a propellant immiscible gas, such as nitrogen, and for dispensing measured quantities thereof, includes a container 11, a valve assembly 12 and an auxiliary tank 13. The container, which may be of any type known to the art and contains a material 14 under the pressure of a propellant immiscible gas located at 15, is formed with an open end, the opening being defined by a bead portion 16. The valve assembly, which includes a valve unit 17 and a laterally extending mounting portion 18 is disposed in the open end of the container 11 for closing the container and dispensing similar measured quantities of the material 14. While the valve unit 17 may be in the form of any metering valve known to the art, for purposes of illustration, the valve construction of the type shown in my copending application Serial Number 839,899, now United States Patent No. 3,003,662, is illustrated in FIG. 4 and reference is made to such patent and, specifically, FIG. 2 thereof for details of construction and operation. Basically, however, the valve unit includes a valve housing 19 providing a measuring chamber having inlet and outlet means cooperating with a valving means including a stem 20 operable to close the inlet means (not shown) for trapping material in the measuring chamber and thereafter communicating the measuring chamber with the atmosphere by movement of the part 21 in the stem inwardly of the seal 21a to provide an outlet means, the quantity of material being dispensed from the measuring chamber on each operation of the valve always being substantially the same. The valve unit 17 is mounted within the mouth or open end of the container 11 by the laterally extending mounting portion 18 which is provided with an integral rim 22 including an upwardly extending portion 23 and a depending skirt portion 24. As shown, the rim fits over and around the bead portion 16 of the container 11.

The auxiliary tank 13, which is disposed around the valve means 17 and is openly communicated with the measuring chamber therein through ports 25, provides trap means for a propellant charge as will be hereinafter explained and, if necessary, supplements the measuring chamber to facilitate the dispensing of larger measured quantities of material. The auxiliary tank is mounted within the container 11 in operable relation to the valve unit 17 by means of a flared portion 26 formed integral with the upper edge of the tank. The flared portion, in the mounted position of the auxiliary tank, extends under the rim 22 of the laterally extending mounting portion 18 and partially around the bead 16, ending short of the end of the skirt portion 24. A resilient gasket 27 is positioned on the bead portion 16 to extend under and in engagement with both the flared portion of the auxiliary tank 13 and the rim 22 of the mounting portion. As will be seen, the mounting portion 18 forms a closure for the auxiliary tank and the rim and the auxiliary tank 13 in the assembled position of the valve assembly are crimped, into engagement with the inner edge of the container adjacent the bead, as at 28, for sealingly closing the end of the container and retaining the parts in position. It will be seen that in the assembled position of the parts, the mounting portion 18, with the rim extending completely around the bead portion 16 of the container, causes the gasket 27 to seal both the container and the tank from the atmosphere.

Referring now specifically to FIG. 2, it will be seen that the auxiliary tank 13 is formed at its bottom with a boss 29 having a portion 29a connected to the valve unit and forming a part of the inlet means and a portion 29b extending below the bottom of the tank for sealingly connecting the dip tube 30 to the valve unit.

In my prior invention, as disclosed in my copending application, Serial Number 839,899, now United States Patent No. 3,003,662 material 14 was dispensed in measured amounts from a container which was under the pressure of a propellent immiscible gas by utilizing the air which was trapped at atmospheric pressure in the measuring chamber. According to that invention the air in the measuring chamber was compressed under the force of the material entering the measuring chamber through the inlet means into the auxiliary tank which formed a trap for the compressed air. Thereafter, when the inlet means was closed and the predetermined quantity of material was trapped in the measuring chamber between the compressed air and the outlet means, a piston, in effect, was produced in the valve which, on communicating the valve with the atmosphere through the outlet means, forced all of the material therefrom. While my prior invention was highly successful in dispensing materials in a manner which heretofore had not been possible, it had a failing in that as the compressed air expanded the pressure in the measuring chamber was reduced to the point that the material could not be operably forced through a mechanical break-up device or the like.

In order to overcome the aforenoted problem and to provide a sustained force by which to dispense all of the material from the measuring chamber, the present invention provides means for introducing a predetermined quantity of the propellent immiscible gas from the container into the measuring chamber. This gas, when introduced into the measuring chamber, supplements the air that is trapped therein and forms with such air, on being compressed, a propellant charge which produces a sustained force against the material to drive all of it from the measuring chamber when the chamber is communicated with the atmosphere. As illustrated, an orifice 31 is formed in the inlet means, as by forming it in the boss 29, above the level of the material 14 in the container 11. In this manner, when the measuring chamber is opened to the container through the inlet means, a quantity of gas is introduced into the material entering the chamber through the dip tube and is carried thereby into the measuring chamber for supplementing the air therein.

It has been found that by controlling the size of the orifice relative to the size of the dip tube that the quantity of gas and consequently the quantity of material entering the chamber can be controlled. In FIG. 2 a construction is shown in which a dip tube of a fixed predetermined size is frictionally mounted on the outer surface of a neck 32, forming part of portion 29b of mounting means 29. In this construction, control over the quantity of gas and material entering the chamber is achieved by varying the size of the orifice 31. In FIG. 3 an alternate construction is shown wherein the dip tube is frictionally mounted within the bore of the neck 32 and in this construction variation in the quantity of gas and material entering the chamber may be achieved by varying the size of either or both the orifice 31 and the bore of the dip tube.

According to the present invention, in order to dispense measured quantities of the material 14 from the container 11, when the measuring chamber is opened to the container through the inlet means a predetermined quantity of propellent immiscible gas located at 15 in the container is introduced, in the form of a bubble or bubbles in the material entering the chamber through the inlet means and is carried thereby into the measuring chamber. This gas is then compressed, along with the air which is trapped in the measuring chamber, into the trap formed at the top of the auxiliary tank, as at 33, by the pressure of the material entering the chamber, to form a self-contained propellent charge within the valve. Thereafter when the inlet means is closed by manipulation of the valve stem 20 to cause portion 20a to close the inlet aperture 12a a predetermined quantity of material is trapped in the chamber and auxiliary tank, as at 34, between the propellent charge and the outlet means. Subsequently, on further operation of the valve stem the port 21 is moved into the chamber to open the outlet means the propellent charge expands and provides a sustained force for driving all of the material from the valve under sufficient pressure to produce the desired results.

By means of the present invention a dispensing device and method have been provided for discharging measured quantities of material from a container which is under pressure of a propellent immiscible gas by forming within the measuring chamber itself a self-contained propellent force wholly independent of the propellent in the container.

Further, because of the difference in pressure in the chamber and container when the valve is released at the end of a dispensing operation, it has been found that the chamber provides a suction means for sucking up the material in the container so that substantally all of the material in the container is dispensed.

While the foregoing description deals with the dispensing of measured charges of material from the container it is to be understood that the device of the present invention may also be used to dispense material under pressure where measured quantities are not required because the valve controlling the inlet means will form a safety means for preventing unintentional discharge of the gas from the container when the outer means is opened to the atmosphere as might occur if the container were in an inverted position. In these circumstances, the "measuring chamber" becomes a reservoir for material to be dispensed under the action of the compressed gas and as much of the material in the reservoir can be dispensed as desired and the reservoir will be replenished when the outlet means is closed. Thus, in the claims, the term "measuring chamber" is used to indicate the material receiving chamber, whether it be for measuring the quantity or serving as a reservoir.

Thus, among others, the several objects and advantages of the invention as aforenoted are achieved. Obviously numerous changes in the structure may be resorted to without departing from the spirit of the invention as defined by the claims.

I claim:

1. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, and means providing communication for a quantity of propellent immiscible gas to enter into the chamber for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

2. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, and means enabling a quantity of propellent immiscible gas from the container to be passed into the chamber for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

3. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, and means enabling a quantity of propellent immiscible gas from the container to be passed into the material entering the chamber for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

4. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, and means forming part of said inlet for the measuring chamber and communicating with the interior of said container above the level of the material therein for passing a quantity of propellent immiscible gas from the container into the material entering the chamber for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

5. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, said inlet for the chamber including conduit means extending into said container below the level of the material therein, and means on the inlet communicating with the interior of said container above the level of the material for enabling a quantity of propellent immiscible gas from the container to pass into the material entering the chamber through the conduit for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

6. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, said inlet for the chamber including a dip tube extending into said container below the level of the material therein, and means forming an orifice of predetermined size relative to said dip tube communicating the interior of the container above the level of the material with the dip tube for introducing a quantity of propellent immiscible gas from the container into the material entering the chamber through the dip tube for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

7. A device for dispensing a predetermined measured quantity of material from a container in which said material in the container is under pressure of a propellent immiscible gas in excess of atmospheric pressure, including a valve housing providing a measuring chamber having an inlet and an outlet therein, valving means including a valve stem provided with means for closing said inlet to retain a measured quantity of material in said chamber and thereafter opening said outlet to communicate said chamber with the atmosphere, a portion of said valve housing forming an air trap located on the side of the material in the measuring chamber opposite the outlet and adapted to have air therein compressed by the material entering the chamber under the force of said immiscible gas, said inlet including connecting means sealably connected thereto for operably connecting a dip tube extending into the container below the level of the material therein with the chamber, said connecting means being formed with an orifice communicating said inlet with the interior of the container above the level of the material for introducing a quantity of propellent immiscible gas from the container into the material entering the chamber through the inlet for supplementing the trapped air and forming therewith a propellent charge in the chamber adapted to be compressed into the trap by the force of the material entering the chamber, said air trap being so disposed that on the inlet being closed and the outlet being opened the compressed propellent charge expands in the air trap to force the material from the measuring chamber, said propellent charge on expanding providing a sustained force for driving all of the material from the chamber.

8. The invention as defined in claim 1 wherein said container has an open mouth surrounded by a bead having a gasket thereon, wherein said housing has a flared portion overlying the bead, and wherein said valving means includes a metal mounting plate extending over the flared end of the housing and rolled into sealing engagement with the bead and the flared end of the housing.

References Cited in the file of this patent

UNITED STATES PATENTS

| | | |
|---|---|---|
| 1,747,608 | Sweetland | Feb. 18, 1930 |
| 2,149,633 | Schnoor | Mar. 7, 1939 |
| 2,246,594 | Kinsella | June 24, 1941 |
| 2,331,117 | Goodhue et al. | Oct. 5, 1943 |
| 2,973,885 | Ferguson | Mar. 7, 1961 |

FOREIGN PATENTS

| | | |
|---|---|---|
| 875,590 | France | June 29, 1942 |